United States Patent
Im

(10) Patent No.: US 7,711,242 B2
(45) Date of Patent: May 4, 2010

(54) DIGITAL VIDEO RECORD/PLAYBACK APPARATUS AND PLAYBACK METHOD THEREOF

(75) Inventor: Jin Seok Im, Seoul (KR)

(73) Assignee: LG Electronics Inc., Seoul (KR)

(*) Notice: Subject to any disclaimer, the term of this patent is extended or adjusted under 35 U.S.C. 154(b) by 1597 days.

(21) Appl. No.: 10/796,139

(22) Filed: Mar. 10, 2004

(65) Prior Publication Data

US 2004/0179825 A1 Sep. 16, 2004

(30) Foreign Application Priority Data

Mar. 11, 2003 (KR) .................. 10-2003-0015116

(51) Int. Cl.
*H04N 5/91* (2006.01)
*H04N 7/00* (2006.01)
*H04N 7/12* (2006.01)

(52) U.S. Cl. .................. 386/68; 386/111; 386/112; 348/423.1

(58) Field of Classification Search .................. 386/68, 386/111, 112; 348/423.01
See application file for complete search history.

(56) References Cited

U.S. PATENT DOCUMENTS 6,453,116 B1 * 9/2002 Ando et al. .................. 386/68
6,658,199 B1 * 12/2003 Hallberg .................. 386/68
7,031,259 B1 * 4/2006 Guttman et al. .................. 370/235

FOREIGN PATENT DOCUMENTS

KR 10 2002 0018138 A 3/2002

OTHER PUBLICATIONS

An Mpeg-2 digital decoder desing by Greg Reid, 1997, IEEE, 37-42.*

* cited by examiner

*Primary Examiner*—Marsha D Banks Harold
*Assistant Examiner*—Asher Khan
(74) *Attorney, Agent, or Firm*—Birch, Stewart, Kolasch & Birch, LLP

(57) ABSTRACT

Disclosed is a digital video record/playback apparatus and playback method thereof, by which a trick play mode of a digital video stream is processed. In the present invention, the transport stream is stored without additional data, the index information extracted in the storing process includes picture type, location of PCR packet of the corresponding picture, record location of the corresponding picture, etc., and the decoding time point of the picture is determined to display the corresponding picture by appropriately adjusting the transmission bit rate and the status of the VBV buffer according to the trick play mode in playing back the digital video stream. Therefore, without additional appended devices and a series of processing, the present invention enables to implement the trick play of the user-selected direction and speed and to reduce costs.

20 Claims, 14 Drawing Sheets

| picture type | PCR stored location | picture stored location |
|---|---|---|
| I | Ptr(PCR0) | Ptr(I0) |
| B | Ptr(PCR1) | Ptr(B0) |
| B | Ptr(PCR2) | Ptr(B1) |
| P | Ptr(PCR3) | Ptr(P0) |
| B | Ptr(PCR4) | Ptr(B2) |
| B | Ptr(PCR5) | Ptr(B3) |
| P | Ptr(PCR6) | Ptr(P1) |
| B | Ptr(PCR7) | Ptr(B4) |
| B | Ptr(PCR8) | Ptr(B5) |
| P | Ptr(PCR9) | Ptr(P2) |
| B | Ptr(PCR10) | Ptr(B6) |
| B | Ptr(PCR11) | Ptr(B7) |
| P | Ptr(PCR12) | Ptr(P3) |
| B | Ptr(PCR13) | Ptr(B8) |
| B | Ptr(PCR14) | Ptr(B9) |
| I | Ptr(PCR15) | Ptr(I1) |
| B | Ptr(PCR16) | Ptr(B10) |

FIG. 8A

| picture index | I0 | B0 | B1 | P0 | B2 | B3 | P1 | B4 | B5 | P2 | B6 | B7 | P3 | B8 | B9 | I1 | B10 | B11 | P4 | B12 | B13 | P5 | B14 |
|---|---|---|---|---|---|---|---|---|---|---|---|---|---|---|---|---|---|---|---|---|---|---|---|
| DTS | T0 | T1 | T2 | T3 | T4 | T5 | T6 | T7 | T8 | T9 | T10 | T11 | T12 | T13 | T14 | T15 | T16 | T17 | T18 | T19 | T20 | T21 | T22 |

| | I0 | P0 | P1 | P2 | P3 | I1 | P4 | P5 |
|---|---|---|---|---|---|---|---|---|
| DTS | T0' | T1' | T2' | T3' | T4' | T5' | T6' | T7' |

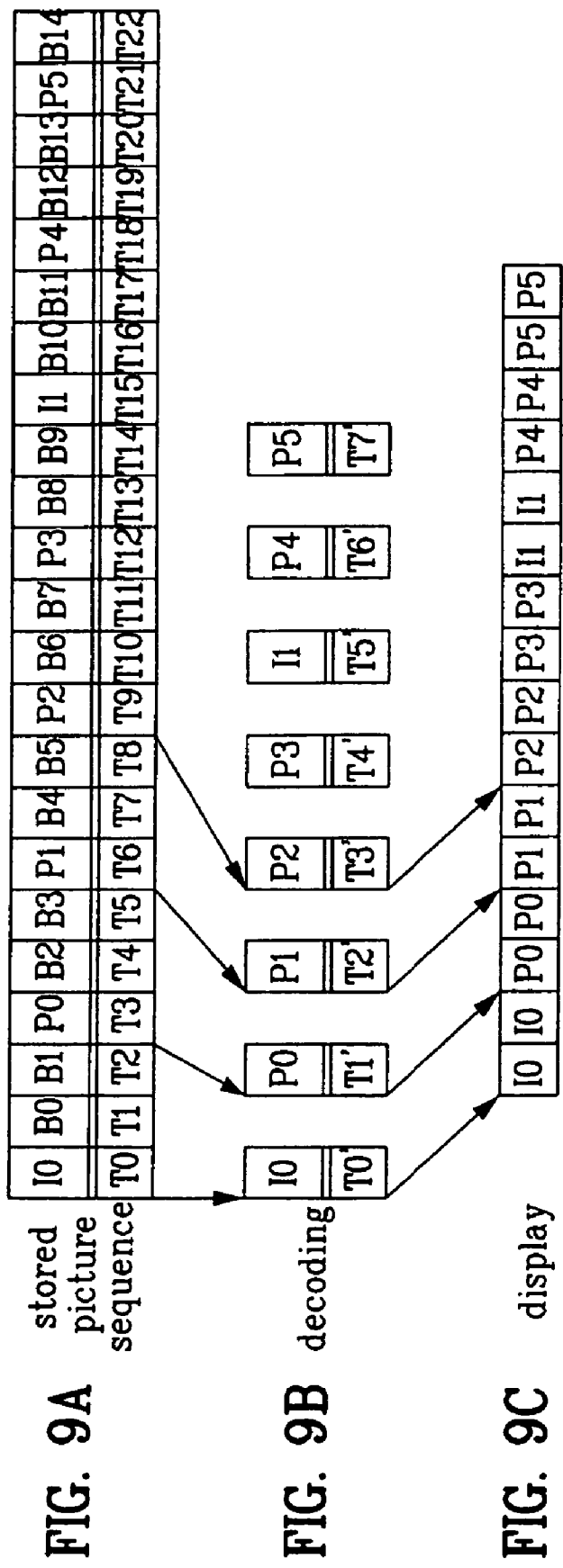

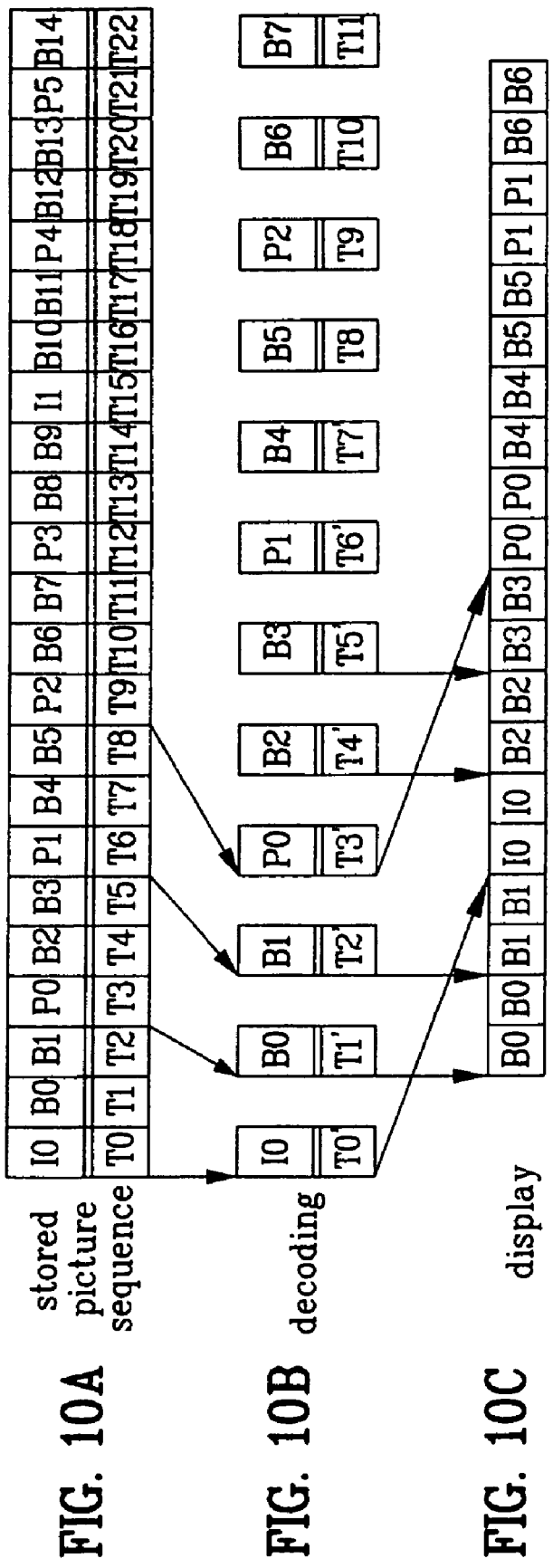
FIG. 10A  stored picture sequence
FIG. 10B  decoding
FIG. 10C  display

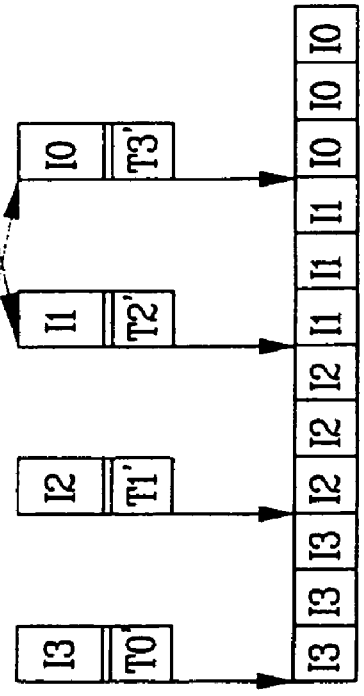
FIG. 11A stored picture sequence
FIG. 11B decoding
FIG. 11C display

DIGITAL VIDEO RECORD/PLAYBACK APPARATUS AND PLAYBACK METHOD THEREOF

This application claims the benefit of the Korean Application No. P2003-15116 filed on Mar. 11, 2003, which is hereby incorporated by reference.

BACKGROUND OF THE INVENTION

1. Field of the Invention

The present invention relates to recording and playback of digital video stream and playback method thereof, and more particularly, to a digital video record/playback apparatus and playback method thereof.

2. Discussion of the Related Art

Generally, data formats of the MPEG (mobbing picture experts group) standard used for compression and transmission of digital video follow either a program stream or a transport stream. The program stream is used in storing digital video having less transmission error in a storing medium, whereas the transport stream using fixed-length packets is used for digital broadcasting having a relatively unstable transport channel and the like. A system, i.e. ISO/IEC 13818-1 system, for transmitting digital video by parsing it into uniform-unit packets is advantageous in error reduction and detection features.

As an apparatus for recording previously and playing back a transmitted transport stream of digital broadcasting, we can consider a device of converting to record a transport stream to a program stream to facilitate playback by extracting appended information required for the playback at a time point of recording digital video and using a player for a conventional storage device. For instance, a digital broadcast stream is converted to a program stream for playback facilitation of a DVD (digital versatile disc) player and is then played back on a display device in accordance with a variety of playback techniques using DVD appended information.

Yet, a general transport stream storage device firstly extracts a number of information required for playback without additional process and device for conversion to a program stream and then inserts timestamps therein to record in a storage device. In doing so, the information required for the playback includes a starting location of picture, a picture type, an encoded frame rate, a bit rate, etc. In playback, such a kind of information is used for a trick play at high or low speed and the like in accordance with an output mode setup.

U.S. Pat. No. 6,16,843 entitled 'Recording and playback of audio-video transport streams' proposes an apparatus and method for playing back a transport stream at a normal speed using a timestamp after a series of recording process for inserting the timestamp into the transport stream using PCR (program clock reference).

In the above-explained playback, a digital video stream recorded in the storage device enables to implement the trick play according to various output mode setups, which is proposed and disclosed in U.S. Patent Public Laid-Open Ser. No. US2002/044761 A1 entitled 'Transmitting apparatus of image information, transmission system, and transmitting mode'.

FIG. 1 is a block diagram of an image information transmitting device disclosed in the U.S. Patent Public Laid-Open Ser. No. US2002/044761 A1. In case of outputting an MPEG stream of trick play, such an output mode as a fast forward playback, fast reverse playback, slow playback, and the like s determined by a control of an output control unit 16. The determined output mode is outputted to an interpret/re-record unit 15. The interpret/re-record unit 15 reads the stream by picture unit, interprets a picture header, and carries out a trick play processing according to output mode information determined in the output control unit 16.

For instance, when a stream displaying the same picture multiple times by slow playback, a skip P picture (hereinafter abbreviated Ps) is used. Namely, if the picture to be displayed is an I or P picture, the skip P picture is outputted to keep being displayed for the original picture. In other words, in case of repeating to display the I picture, 'IPsPsPs . . .' is outputted in place of 'IIII . . .'. And, in case of repeating to display the P picture, 'PPsPsPs . . .' is outputted in place of 'PPPP . . .'.

In doing so, when the picture is outputted, two kinds of processing are carried out for the conversion to bit streams suitable for the MPEG standard.

First of all, a value of temporal_reference within the picture header is re-recorded as an accurate value. The temporal_reference indicates a display sequence of the picture within GOP (group of picture). Hence, if the temporal_reference value is outputted without being re-recorded, it violates the MPEG standard.

Secondly, a value of vbv_delay (accumulation quantity of a virtual input buffer of decoder) within the picture header is re-recorded as '0xFFFF'. This value is a code indicating a null of the vbv_delay. In doing so, the re-recording is carried out because a wrong result is brought about in case of using an original value of the vbv_delay is used as it is, since the picture sequence is varied from an original one on trick play.

Thus, the re-recorded trick play stream is decoded by a general video decoder to be outputted to a screen.

For this, additional devices, i.e., interpret/re-record unit 15 and skip P picture generating unit 18, indicated by dotted lines in FIG. 1 are needed.

The skip P picture generating unit 18 is a unit of generating arbitrarily added P pictures to regulate a frame rate of fast or slow playback in a trick play mode.

In this case, a first macro block of a picture slice is encoded as No MC Not Coded MB (macro block) and the rest macro blocks of the slice are encoded as Skip MB. The No MC (i.e., prediction between simple frames) Not Coded (i.e., having no DCT coefficient) macro block has a motion vector (0, 0) and is a macro block where a motion compensation differential value, i.e., inverse discretion cosine transform (IDCT) coefficient, fails to exist. And, the skip macro block (SB) in the P picture has a motion vector (0, 0) like the No MC Not Coded macro block and is processed as having no motion compensation differential value.

When the skip P picture proposed by the related art is transferred to a video decoder to be decoded accordingly, it brings about an effect that the previous I or P picture is repeatedly played back. In the related art, the skip P picture is encoded into the above-explained picture structure and recorded in a memory device. The skip P picture is then transferred to the video decoder in case of being needed as the trick play mode is set up.

Most of bit data of the skip P picture are encoded into skip macro blocks not to thereby occupy a quite great bit quantity. In spite of small quantity, needed are a memory device for recording the skip P picture and an additional process of reading picture data from the memory device to transfer to the video decoder. Moreover, added are steps of demultiplexing the transport stream to correctly reset the values of the temporal_reference and vbv_delay, decoding the demultiplexed transport stream into PES (packetized elementary stream), and decoding the PES into ES (elementary stream).

Besides, in case that the trick play mode is a slow mode, in the related art shown in FIG. 1, a copy of a B picture is transferred to the video decoder, in which an additional process of reading from the storage device a previous B picture to transfer is needed as well.

FIG. 2 and FIG. 3 illustrate a trick play method according to a related art. FIG. 2 shows a case that the trick play mode is set to a fast forward playback mode, in which I and P pictures are just selected to transfer from an original video stream to cope with a frame rate of 1.5× speed playback and a skip P picture is added in the middle to be transferred to the video decoder. The skip P picture added to a location of which temporal_reference is 1 repeats the I picture at a location of which temporal_reference is 0 to display on the display device.

FIG. 3 shows a case that a trick play mode is set to a slow forward playback mode, in which skip P picture and copied B picture are added to an original video stream to be transferred to the video decoder in order to implement a frame rate of 0.5× speed. And, the copied B picture plays a role in repeating a previous B picture to be displayed on the display device.

However, in the related art shown in FIG. 1, additionally needed to implement the trick play are the memory device for storing the skip P picture as well as the process for reading from the memory and storage devices the skip P picture and copied B picture to transfer to the video decoder.

Moreover, the related art additionally needs a mandatory process of updating the picture header information including temporal_reference and the like.

SUMMARY OF THE INVENTION

Accordingly, the present invention is directed to a digital video record/playback apparatus and playback method thereof that substantially obviates one or more problems due to limitations and disadvantages of the related art.

An object of the present invention is to provide a digital video record/playback apparatus and playback method thereof, by which a digital video stream is transferred and decoded at a frame rate suitable for a trick play mode without including an additional memory device or an additional series of processing to be displayed on a display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a system recording and playing back a transport stream transmitted by a digital broadcast, a digital video record/playback apparatus according to the present invention includes an output control unit outputting a predetermined playback mode, a transmission control unit controlling a transmission bit rate and transmission time point of the transport stream based on the predetermined playback mode and VBV (video buffering verifier) buffer status information, a demux performing an STC (system time clock) count initialization and STC count control on a PCR (program clock reference) packet of the transport stream inputted via the transmission control unit, the demux extracting ES (elementary stream) data for a program data packet of the transport stream, a VBV buffer temporarily storing the extracted ES data, the VBV buffer playing a role in buffering between the transmission bit rate and a decoding frame rate, the VBV buffer outputting a buffer status to the transmission control unit, and a decoder adjusting DTS (decoding timestamp) according to the predetermined playback mode of the output control unit, the decoder controlling a decoding time point by comparing the adjusted DTS to an STC count value and decoding the ES data outputted from the VBV buffer.

In another aspect of the present invention, a digital video record/playback apparatus includes a record control unit only selecting transport packets corresponding to a program to be stored in a transport stream, the record control unit extracting picture information and PCR (program clock reference) of the program to be used in playback, a storage medium storing the transport packets of the program selected in the record control unit, the picture information, and the PCR of the selected program, an output control unit outputting a predetermined playback mode, a transmission control unit controlling a transmission bit rate and transmission time point of the transport stream based on the predetermined playback mode and VBV (video buffering verifier) buffer status information, a demux performing an STC (system time clock) count initialization and STC count control on a PCR (program clock reference) packet of the transport stream inputted via the transmission control unit, the demux extracting ES (elementary stream) data for a program data packet of the transport stream, a VBV buffer temporarily storing the extracted ES data, the VBV buffer playing a role in buffering between the transmission bit rate and a decoding frame rate, the VBV buffer outputting a buffer status to the transmission control unit, and a decoder adjusting DTS (decoding timestamp) according to the predetermined playback mode of the output control unit, the decoder controlling a decoding time point by comparing the adjusted DTS to an STC count value and decoding the ES data outputted from the VBV buffer.

In a further aspect of the present invention, a playback method in a digital video record/playback apparatus includes a step (a) of storing transport packets of a selected program, picture information, and PCR (program clock reference) of the selected program, a step (b) of performing STC (system time clock) count initialization using a value of the stored PCR and incrementing or decrementing an STC count according to a direction of a trick play mode, a step (c) of adjusting DTS (decoding timestamp) of a picture to be decoded according to the direction and multiple-times speed of the trick play mode, and a step (d) of decoding to output picture data of the selected program by controlling a decoding time point by comparing a value of the adjusted DTS to a value of the incremented or decremented STC count and by referring to the picture information according to the trick play mode.

Preferably, in the step (b), the STC count is sequentially incremented in case of a forward trick play or sequentially decremented in case of a reverse trick play.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8A is an exemplary diagram of a picture sequence stored in a storage device in case of 3× speed fast forward playback mode according to the present invention;

FIG. 9A is an exemplary diagram of a picture sequence stored in a storage device in case of 1.5× speed fast forward playback mode according to the present invention;

FIG. 9B is an exemplary diagram of a trick play picture sequence read to be decoded from the storage device in FIG. 9A by a transmission control unit in FIG. 4;

FIG. 9C is an exemplary diagram of displaying the decoded picture sequence like FIG. 9B;

FIG. 10A is an exemplary diagram of a picture sequence stored in a storage device in case of 1.5× speed slow forward playback mode according to the present invention;

FIG. 10B is an exemplary diagram of a trick play picture sequence read to be decoded from the storage device in FIG. 10A by a transmission control unit in FIG. 4;

FIG. 10C is an exemplary diagram of displaying the decoded picture sequence like FIG. 10B;

FIG. 11A is an exemplary diagram of a picture sequence stored in a storage device in case of 5× speed fast forward playback mode according to the present invention;

FIG. 11B is an exemplary diagram of a trick play picture sequence read to be decoded from the storage device in FIG. 11A by a transmission control unit in FIG. 4;

FIG. 11C is an exemplary diagram of displaying the decoded picture sequence like FIG. 11B;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
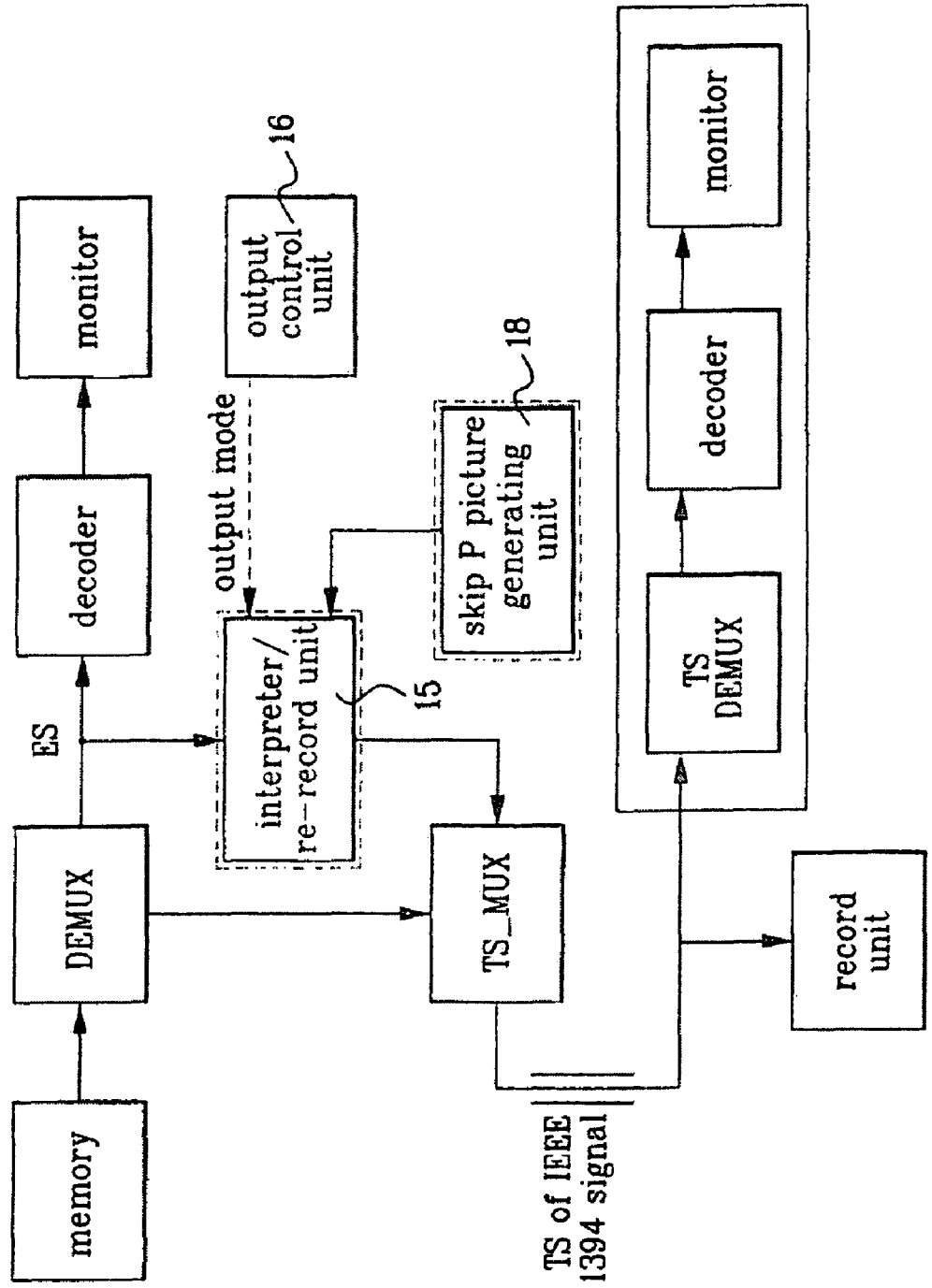
FIG. 1 is a block diagram of a digital video record/playback system according to a related art.
Figure 2:
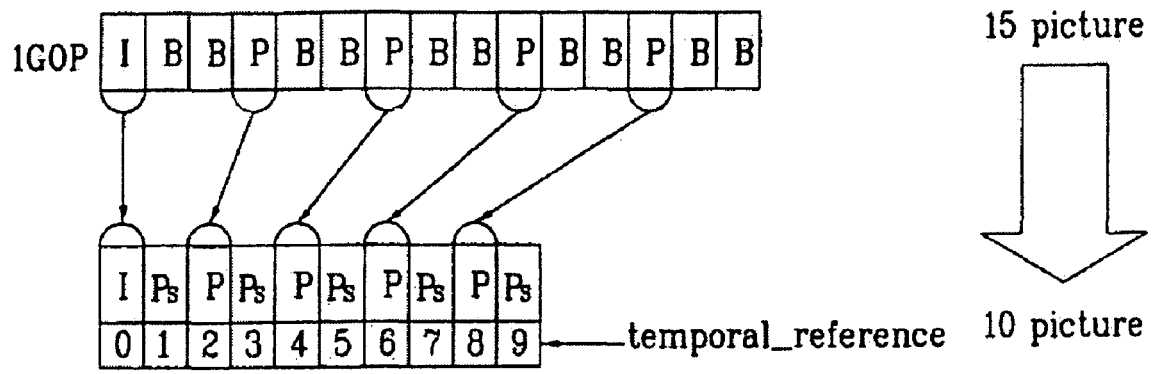
FIG. 2 is a diagram of an operation in case of performing fast playback in FIG. 1.
Figure 3:
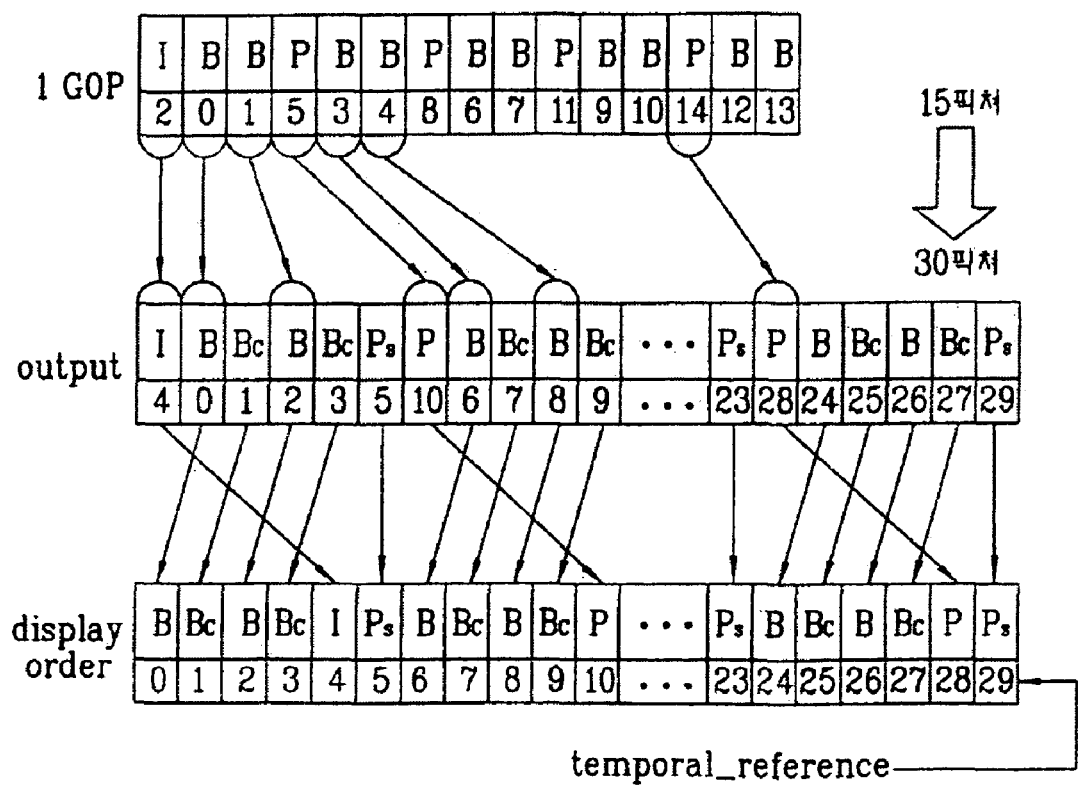
FIG. 3 is a diagram of an operation in case of performing slow playback in FIG. 1.
Figure 4:
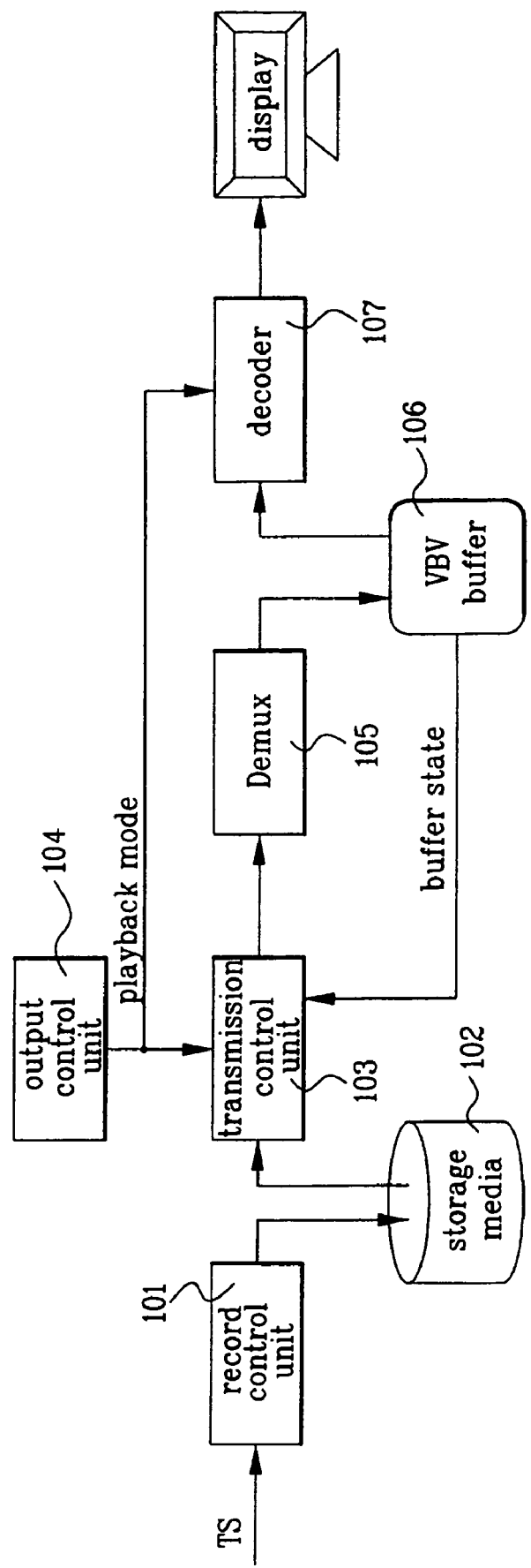
FIG. 4 is a block diagram of a digital video record/playback system according to the present invention.

FIG. 4 is a block diagram of a digital video record/playback system according to the present invention.

Referring to FIG. 4, a digital video record/playback system according to the present invention includes a storage medium 102 selecting to record only a transport packet corresponding to a program to be stored, a record control unit 101 not inserting a timestamp in a recording process, the record control unit 101 storing an associative relation to location information of each picture recorded on the storage medium by searching required information such as a picture index and the like, an output control unit 104 outputting a playback mode set up by a user, a transmission control unit 103 controlling a transmission bit rate and transmission time point of a transport stream stored in the storage medium 102 using the playback mode set up by the output control unit 104 and status information of a VBV (video buffering verifier) buffer 106, a demux 105 receiving the transport stream from the transmission control unit 10 to control STC count initialization for a PCR packet and to extract ES data for a program data packet, a VBV buffer 106 temporarily storing the ES data outputted from the demux 105, the VBV buffer 106 playing a role in buffering between a bit rate and a decoding frame rate, the VBV buffer 106 informing the transmission control unit 104 of a status of the buffer itself to be smoothly controlled, and a decoder 107 decoding the ES data outputted from the VBV buffer 106 to output to a display device by controlling decoding and display time points by adjusting DTS and PTS according to the playback mode set up by the output control unit 104.

The above-constructed digital video record/playback system according to the present invention is explained as follows.

First of all, the record control unit 101 selects the transport packet corresponding to the program to be stored only from inputted transport packets and then records the selected transport packet in the storage medium 102. In doing so, the recording is carried out without inserting the timestamp. And, in the process of the recording, the record control unit 101 stores the associative relation to the location information of each picture recorded on the storage medium 102 by searching the required information such as the picture index and the like to utilize it as information for trick play in the output control unit 104.

The storage medium 102 can be selected from a magnetic tape, CD (compact disk), DVD (digital versatile disk), hard disk (HDD), and other suitable storage devices. And, the storage medium 102 needs to store a large capacity of digital video streams and to be randomly accessible.

Namely, the record control unit 101 has one function of filtering a digital video packet corresponding to the selected program from the inputted transport stream to record the filtered digital video packet in the storage medium 102 and the other function of extracting a plurality of picture information to use at a playback time point.

In accordance with the structure of the transport stream, after intrinsic PIDs (packet identification) are appended to video and audio streams constructing each program, respectively, the video and audio streams are appropriately multiplexed to be transferred. Hence, in case of storing a user-wanted program in the storage medium 102, video and audio packets corresponding to the program are identified by the PID and are then stored in the storage device 102. In doing so, a packet corresponding to a PCR (program clock reference) PID carrying information of a reference clock of the selected program should be additionally stored as well. When video and audio are being recorded, the reference clock information is naturally recorded since the PCR PID has the same value of the video PID.

Figures 5A, 5B:
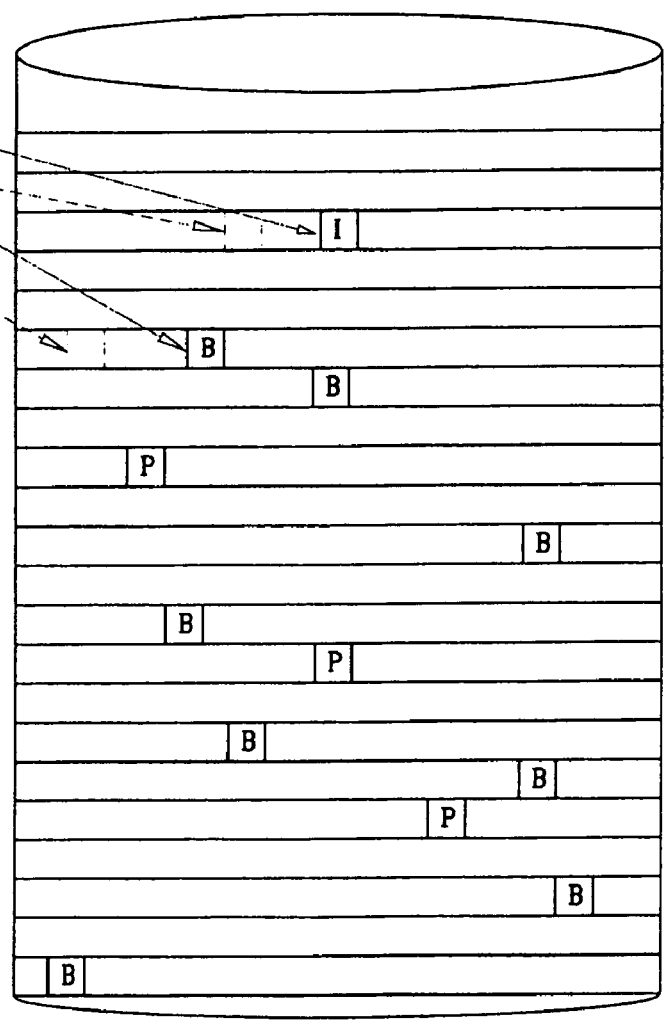
FIG. 5A is an exemplary diagram of picture index information extracted from a record control unit in FIG. 4.
FIG. 5B is an exemplary diagram of storing the picture index information in FIG. 5A in a storage device together with ES data by the record control unit in FIG. 4.

FIG. 5A is an exemplary diagram of picture index information extracted from the record control unit 101, in which each picture type, a series of information of a location where the picture is stored in the store medium 102, and a series of information of the PCR index are illustrated.

The stored location information of each of the pictures, as shown in FIG. 5B, indicates a substantial pointer on the storage medium 102. The PCR index information stored location is a stored location of a packet including the latest inputted PCR for each of the stored pictures. And, the PCR index information is utilized in controlling an STC (system time clock) value to be used in determining the decoding time by a DTS (decoding timestamp) check.

Moreover, the PCR index information and picture index information are referred to in case of executing the trick mode at the playback time point. For instance, in case of executing fast playback by playing back I pictures only, the transmission control unit 103 searches the I pictures from the picture index information and reads the bit stream corresponding to the I pictures from the storage medium 102 by the location information to transfer.

Meanwhile, the output control unit 104 controls a video stream transfer mode of the transmission control unit 103 and a decoding mode of the decoder 107 according to the playback mode set up by the user. And, the playback mode has such a trick play mode as normal playback mode, fast forward playback, fast reverse playback, flow forward playback, etc.

The transmission control unit 103 reads the bit stream from the storage medium 102 to maintain the accurate frame rate according to such a playback mode and then transfers it to the decoder 107 via the demux 105 and VBV buffer 106.

Figure 6:
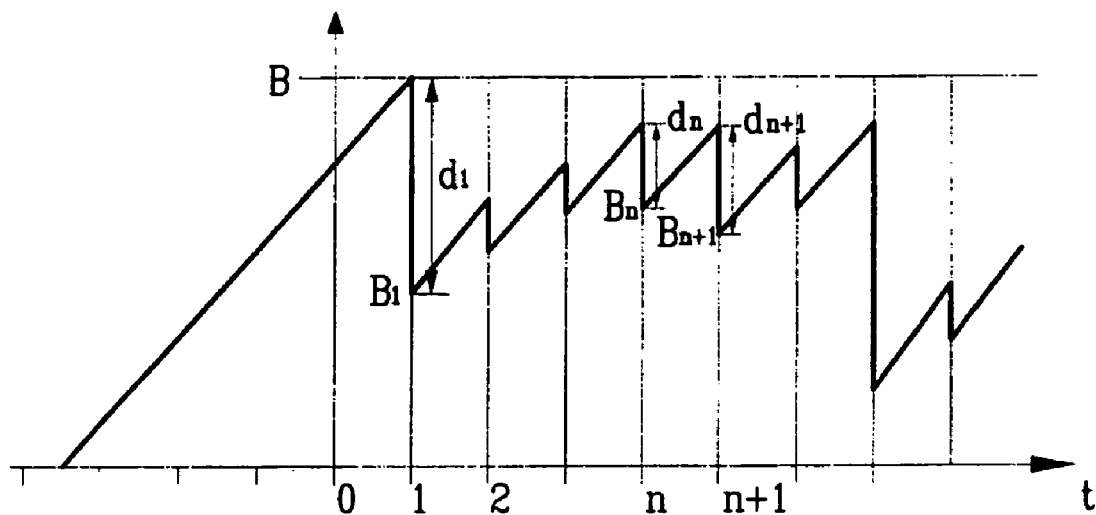
FIG. 6 is a graph of a status of a VBV buffer in case of normal playback according to a related art.
Figure 7:
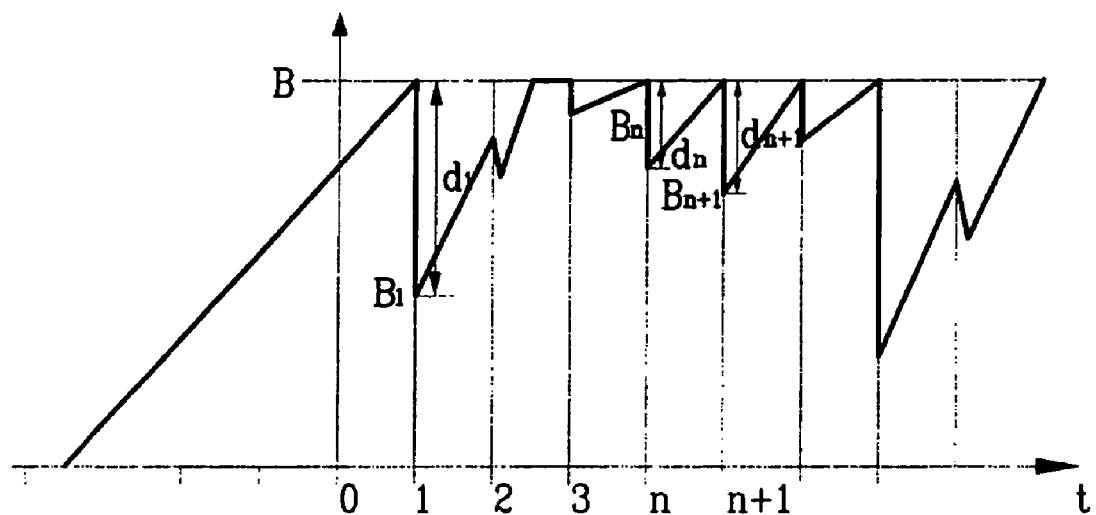
FIG. 7 is a graph of a status of a VBV buffer in case of normal playback according to the present invention.

In case of a normal playback in a digital broadcast receiver having no storage device, i.e., when received data is directly decoded to be displayed, a conventional operation of the VBV buffer 106 is shown in FIG. 6.

FIG. 6 is a graph of a status of the VBV buffer in accordance with decoding each picture at a corresponding frame rate for a time axis t, in which B is a size of the buffer 106, Bn indicates a data quantity of the buffer 106 at nth decoding time, and dn is a bit stream quantity of corresponding picture data.

In a digital video stream playback system proposed by the present invention, the picture data to be decoded is previously recorded in the storage medium 102, whereby the transmission control unit 103 enables to adjust the bit rate according to performance of a read device of the storage medium 102. And, the decoder 107 caries out decoding and display to keep up with DTS (decoding timestamp) and PTS (presentation timestamp), which enables to control the VBV buffer 106.

In case of a normal playback mode, in aspect of power consumption or efficient buffer control, the bit stream stored in the storage medium 102 is preferably transferred to the decoder 107 at a proper bit rate rather than by reading it with maximum performance.

A transmission bit rate $R_n$ of the transmission control unit 103 in case of a normal playback mode proposed by the present invention is expressed in Equation 1.

$$R_n = \frac{B - B_n}{t_{n+1} - t_n}, \quad \text{if } R_n \leq R_{t\,max} \qquad \text{[Equation 1]}$$
$$R_{t\,max}, \quad \text{if } R_n > R_{t\,max}$$

Equation 1 means that a bit stream is transferred as much as a vacant quantity $(B-B_n)$ of the VBV buffer 106 during a decoding cycle $(t_{n+1}-t_n)$ and that transmission is performed at a maximum bit stream rate if the bit rate $R_{tmax}$ is greater than maximum performance $R_{tmax}$ of a read device. The bit stream transmission by the maximum performance repeatedly continues until the VBV buffer 106 is full. When the VBV buffer 106 reaches a full status, the bit stream transmission is stopped and the stop state is maintained until a next decoding time comes.

If DTS is compared to the STC count value to lie within a decoding range when the next decoding time arrives, the decoding is initiated and a new image is displayed. Thus, the operation of the VBV buffer 106 is controlled by maintaining the status of the VBV buffer 106 as full and meeting the decoding time by DTS.

The STC (system time clock) count value of the decoder 107 for determining the decoding time point is initialized by the PCR index information. For instance, if the playback mode is normal playback and a beginning location of the picture to be played back is a first I picture in FIG. 5A, the transmission control unit 103 reads the transport packet at a location Ptr(PCR0) of the picture index information from the storage medium 102 and transmits the read transport packet to the demux 105. The demux 105 ignores other data of the packet but extracts the PCR index information only to perform initialization with the STC count value. Thereafter, the STC count is sequentially incremented by the STC clock. After completion of the STC count initialization, the transmission of the transport packet at the location Ptr(I0) of the picture index information keeps being continuously performed.

A digital video record/playback method according to the present invention is explained in detail by referring to the attached drawings as follows.

First of all, in case of most of the decoding sections, the transmission is performed at the bit rate of the first expression of Equation 1. And, in the section t1~t2, the transmission is made at the maximum bit rate $R_{tmax}$. The transmission continues at the maximum bit rate in the section t2~t3. The transmission is stopped if the status of the VBV buffer becomes full, and waits for a decoding time t3. When the decoding time t3 arrives, DTS is compared to the STC count value. If the comparison result belongs to the decoding range and the video stream of the buffer 106 is decoded, the bit stream transmission is then executed.

Meanwhile, in case of trick play, the transmission control unit 103 transmits the bit stream to the VBV buffer 106 in a manner that the status of the buffer 106 is basically made full like the case of the normal playback. And, the control of the decoding time point is performed by adjustment of DTS.

An adjustment expression of DTS for N-times-speed trick mode is shown in Equation 2.

$$DTS'_n = DTS_0, \qquad n = 0 \qquad \text{[Equation 2]}$$
$$DTS_0 + \frac{DTS_n - DTS_0}{N}, \quad n \neq 0$$

In Equation 2, DTS' is a new DTS value corresponding to a decoding time point and $DTS_0$ indicates a DTS value of a first picture of initiating the trick play. For instance, in case of 2×-speed playback mode, the decoding time point is determined using a new DTS resulted from dividing the DTS by 2. Hence, the decoding is processed twice faster by determining the decoding time point using the half-reduced DTS. On the other hand, in case of (½)×-speed trick play, DTS is doubled to process the decoding at a twice-slower speed.

In this case, the initialization of the STC count value as a reference of the decoding time point is similar to that of the normal playback. Once the playback mode is determined regardless of fast or slow speed and the first picture to be played back is determined, the latest PCR packet of the picture is transferred to the demux 105 using the PCR index of the index information. The demux 105 then extracts from the PCR packet the PCR value only to initialize by the STC count value.

Thereafter, while the playback mode is not changed, a DTS check is performed using a sequential count value of the firstly initialized STC count. Of course, DTS means a readjusted value as shown in Equation 2.

Implementing methods of trick play mode according to several embodiments are explained as follows.

For instance, in case of fast playback, if the decoder 107 fails to be equipped with fast-decoding display performance despite having a transmission device enabling fast transmission of bit streams, it is unable to implement the fast playback. In such a case, the present invention provides fast moving images by trick play of skipping transmission by picture unit using the characteristics of the stored video stream. For such a trick play, the present invention enables to provide natural and real image effects of the trick play using the picture index information, frame rate information, bit rate information and the like which are extracted on storing.

Figures 8B, 8C:
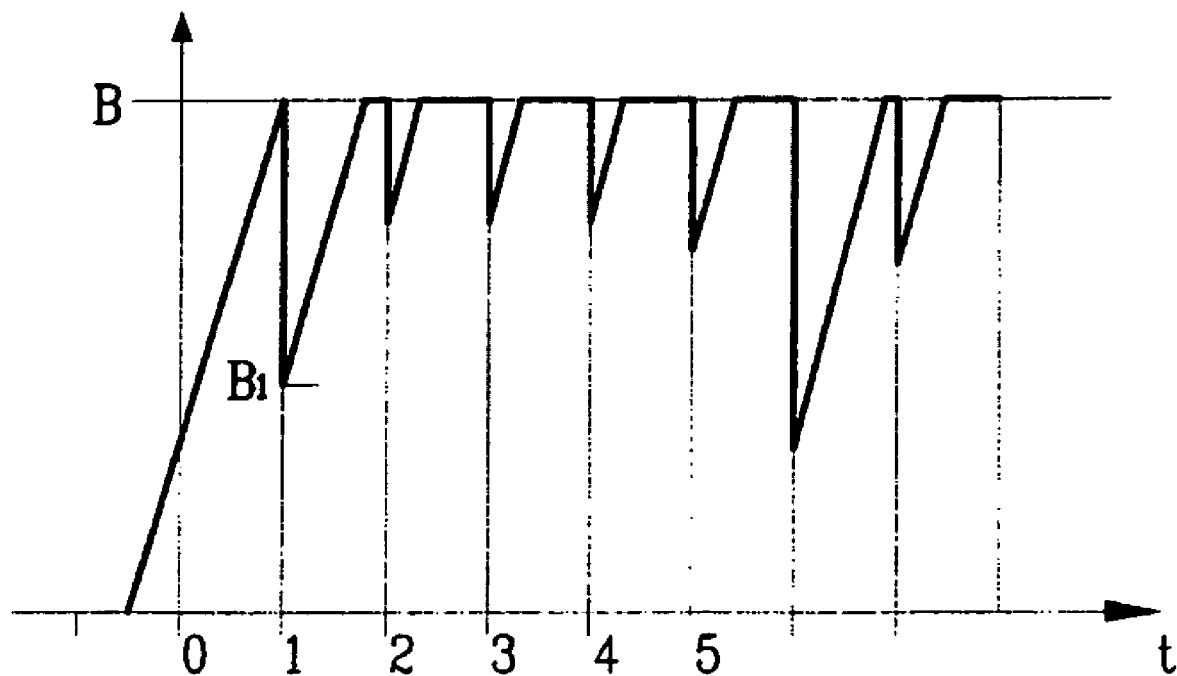
FIG. 8B is an exemplary diagram of a trick play picture sequence read to be decoded from the storage device in FIG. 8A by a transmission control unit in FIG. 4.
FIG. 8C is a graph of a status of a VBV buffer on reading the trick play picture sequence like FIG. 8B.
Figure 9D:
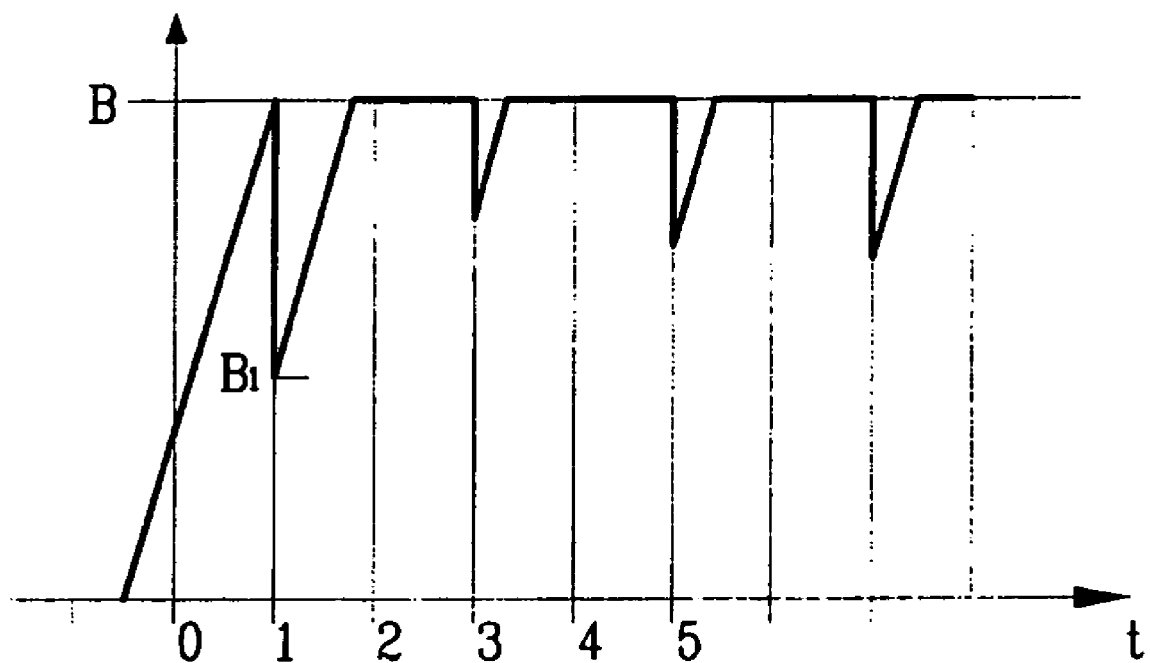
FIG. 9D is a graph of a status of a VBV buffer on reading the trick play picture sequence like FIG. 9B.
Figure 10D:
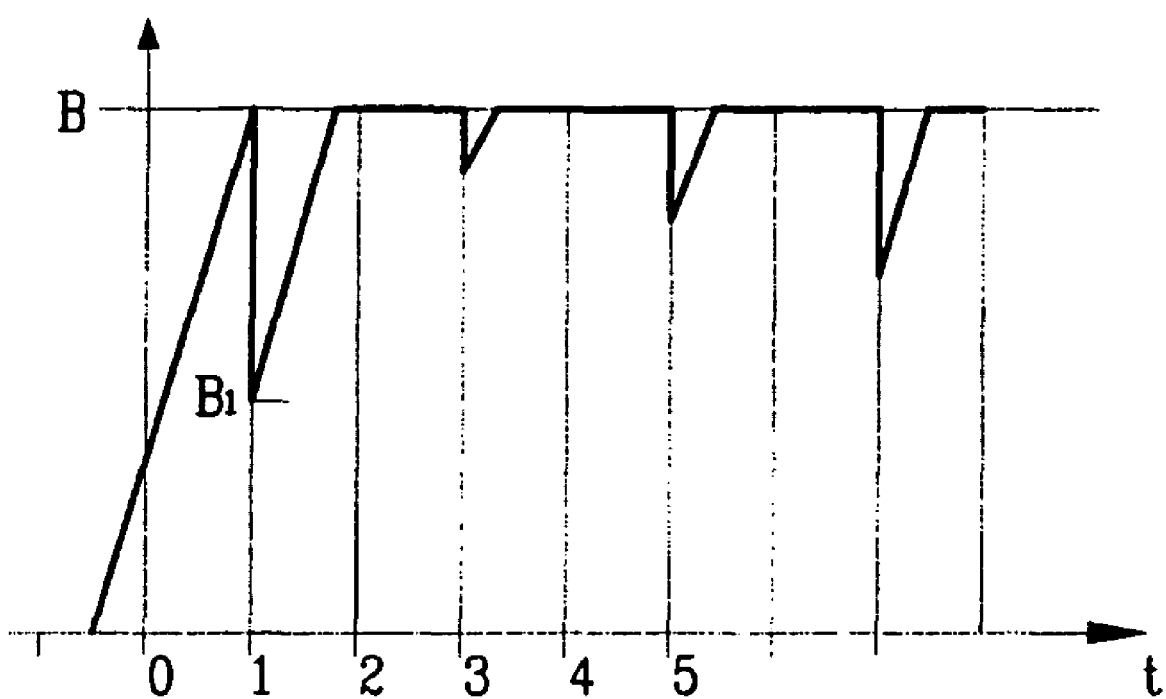
FIG. 10D is a graph of a status of a VBV buffer on reading the trick play picture sequence like FIG. 10B.
Figure 11D:
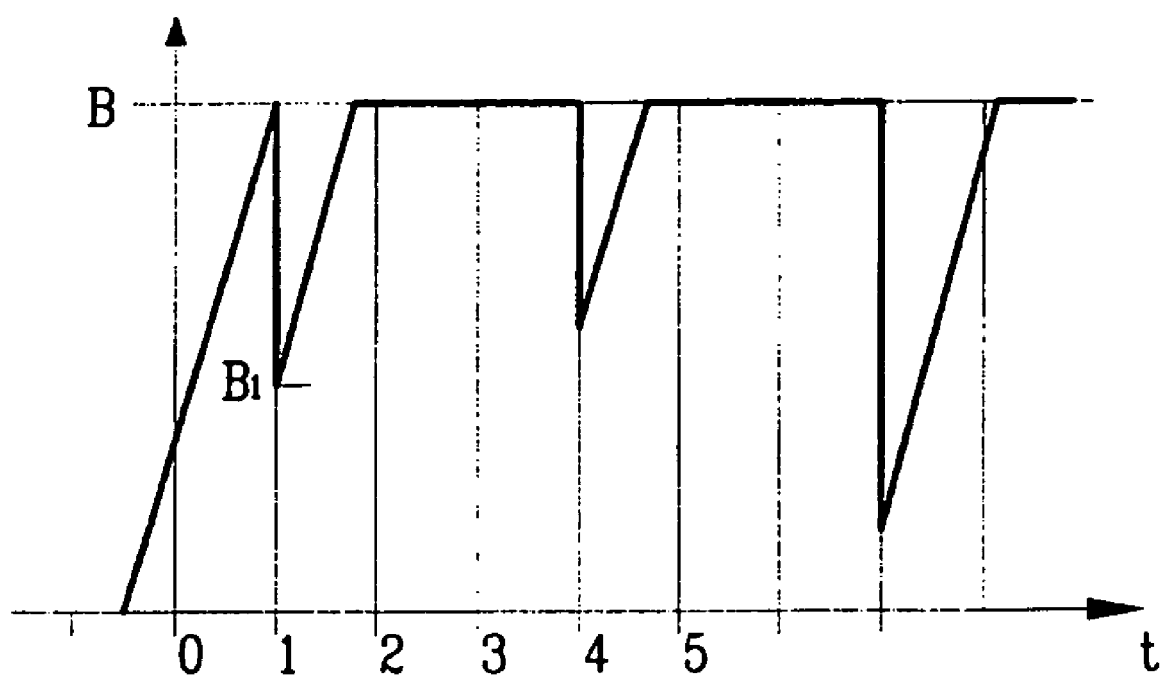
FIG. 11D is a graph of a status of a VBV buffer on reading the trick play picture sequence like FIG. 11B.

FIGS. 8A to 8C illustrate fast forward playback. A picture sequence of FIG. 8A represents a sequence of pictures when the pictures are stored in the storage medium 102. The pictures are substantially recorded in the storage medium 102 in the same manner of FIG. 5B, and have corresponding picture indexes in the same manner of FIG. 5A, respectively. Namely, the fast trick play of FIGS. 8A to 8C illustrates 3×-speed fast forward playback, for which the picture indexes are referred to so that I and P pictures, as shown in FIG. 8B, are selected from a video stream recorded in the storage medium 102 to be transferred to the decoder 107.

In doing so for the fast forward playback, the transmission is performed at a fast bit rate to prevent underflow of the VBV buffer 106 since the I and P pictures having a great deal of data quantity are transferred and decoded. Hence, instead of adjusting a bit rate according to the status of the buffer 106, video bit streams are always transmitted at the maximum performance like Equation 1. Namely, the transmission bit rate in the entire decoding sections equals $R_{tmax}$ and 'N' indicating a speed in Equation 2 is set to '3' to readjust a new DTS for determining the decoding time point. DTS values T0'~T7' in FIG. 8B are set to new values as shown in Equation 3.

$$T0' = T0$$ [Equation 3]
$$T1' = T0 + \frac{T3 - T0}{3}$$
$$T2' = T0 + \frac{T6 - T0}{3}$$
$$...$$
$$T7' = T0 + \frac{T21 - T0}{3}$$

FIG. 8C shows a status of the buffer 106 in case of transmitting a bit stream in fast playback mode. At a decoding time point t1, like Equation 3, decoding is executed by comparing a newly adjusted DTS value T0'. Continuously, at a next decoding time point t2, the decoding is executed by comparing a newly adjusted DTS value T1'. Such a process keeps being executed at the successive decoding time points.

The control of the VBV buffer 106 by the DTS value adjustments can be clearly understood in the case, as shown in FIGS. 9A to 9D, that the fast playback mode is 1.5×-speed. The DTS values can be found by setting 'N' to '1.5' in Equations 2 and 3. In aspect of the decoding at the decoding time points according to the status of the VBV buffer 106 of FIGS. 9A to 9D, the decoding skips the decoding time points by comparison of the adjusted DTS values, thereby implementing the 1.5×-speed decoding.

Various fast trick plays can be implemented by skipping several I or P pictures in accordance with the multiplied speed of the fast trick mode. For instance, 15×-speed fast playback can be implemented by reading to transmit I pictures only from the picture sequence of FIG. 8A and dividing the DTS by 15 to use as the decoding time point.

Implementation of slow forward playback is explained as follows. In case of slow playback, as is the same case of the fast playback, transmission is performed at a video bit stream transmission rate of $R_{tmax}$ that is the maximum performance of a transmission device. FIGS. 10A to 10D illustrate one example of a slow trick play mode, which corresponds to 0.5×-speed trick play. Namely, by setting 'N' to '0.5' in Equation 2, a new DTS value is calculated to follow Equation 4.

$$T0' = T0,$$
$$T1' = T0 + (T1 - T0) \times 2,$$
$$T2' = T0 + (T2 - T0) \times 2,$$
$$...$$
$$T7' = T0 + (T7 - T0) \times 2$$ [Equation 4]

The DTS value is doubled, accordingly. And, as known by the decoding sequence and the status variation of VBV buffer 106, the decoding is performed by skipping the decoding time points. Namely, the decoding is performed at a decoding time point t1 by comparing a new DTS value T0' to STC. At a decoding time point t2, the previously decoded picture is displayed instead of performing the decoding since an STC count value fails to arrive DTS yet as a result of comparison to a new DTS value T1'. And, at a decoding time point t2, since the STC count value arrives at the DTS as a result of the comparison between T1' and STC, the decoding is executed and a new picture is displayed.

In case of fast reverse playback, a DTS check is carried out by transmitting a video stream by $R_{tmax}$ that is the maximum performance bit rate and decrementing an STC value sequentially. In case of the reverse direction, the fast playback using I pictures only is possible but some I pictures having a great deal of data quantity frequently fail to be encoded in the video sequence in general. In most cases, the I pictures are encoded each fifteen pictures. Hence, the fast reverse playback can be naturally played over 5×-speed at least.

In case of reverse playback, the PCR packet to be transmitted for STC count initialization lies not at a location of a picture to be played back but at a location of a picture next to the picture to be played back, which is different from the forward playback. For instance, if a picture for trick play is I1 and its location is Ptr(I1) in FIG. 5A, the STC count is initialized by transmitting the packet of Ptr(PCR16) corresponding to the PCR index of the next picture instead of the packet of Ptr(PCR15).

For the reverse playback, the demux 105 firstly initializes the STC count and then reduces it sequentially to use the value in the DTS check. In order to find the readjusted DTS value to be used in the DTS check by considering the reverse direction, Equation 2 is modified into Equation 5.

$$DTS'_n = DTS_L, \quad n = 0$$
$$DTS_L + \frac{DTS_L - DTS_n}{N}, \quad n \neq 0 \quad \text{[Equation 5]}$$

In Equation 5, $DTS_L$ is a DTS value of a first I picture starting reverse trick play and a new DTS value is lowered according to a corresponding picture.

FIGS. 11A to 11D illustrate 5×-speed reverse trick play. The 5×-speed reverse trick play is carried out in a manner that pictures corresponding to the I picture in the picture sequence stored in the storage medium 102 are transmitted at a frame rate in a reverse direction. Referring to the drawings of the decoding picture sequence and operation of the VBV buffer 106, by the decremented STC count value and the DTS value readjusted by Equation 5, a decoding time point is determined and the buffer 106 is controlled.

Figure 12:
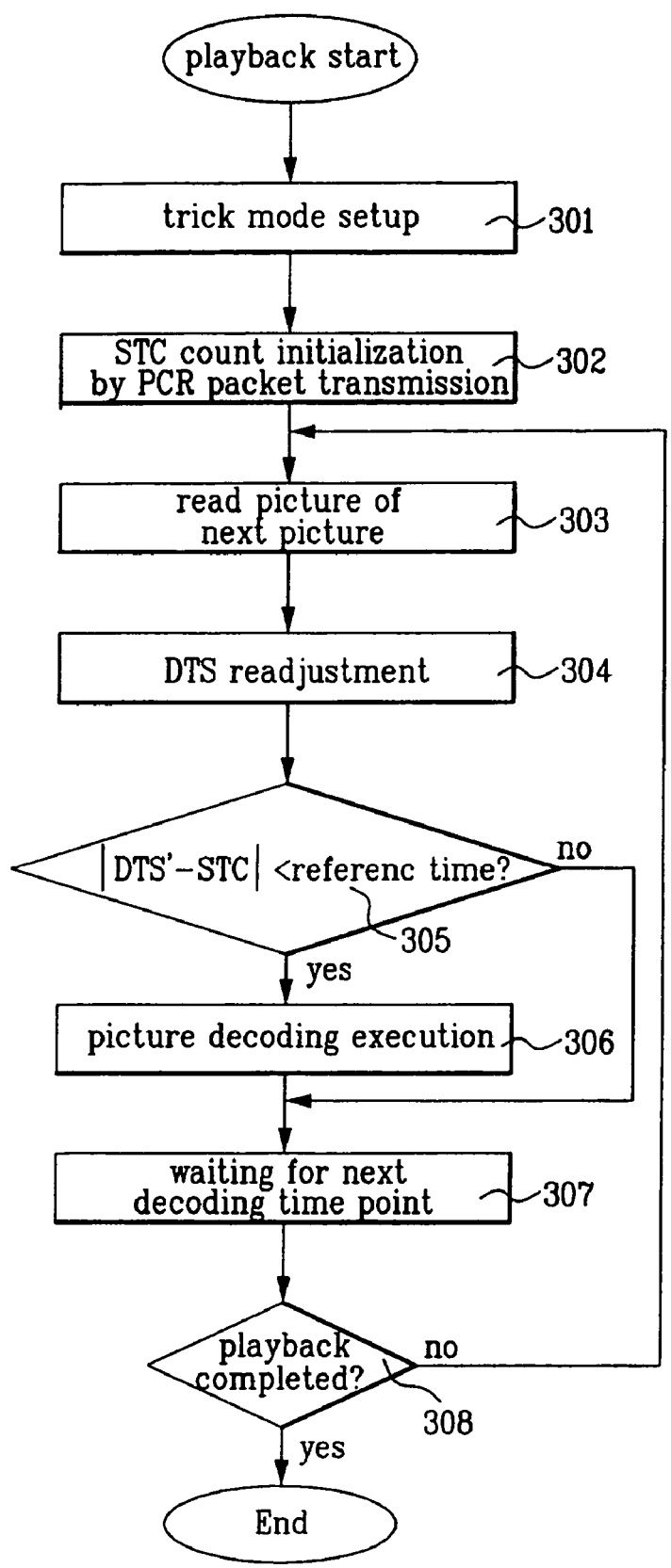
FIG. 12 is a flowchart of a playback method of a digital video stream playback system according to the present invention.

An operational flow of the trick play system of the digital video stream according to the trick play mode is illustrated in FIG. 12, which is generally applicable regardless of any kinds of playback modes.

Referring to FIG. 12, a trick play mode is firstly set up (S301). As an initialization process of the trick play, the transmission control unit 103 outputs a PCR packet to the demux 105 by referring to the PCR index stored in the storage medium 103 and then the demux 105 carries out the STC initialization by the PCR packet (S302). In doing so, the STC count initialization is carried out once according to a change of the trick mode. And, the STC count is sequentially incremented in case of forward trick play or sequentially decremented incase of reverse trick play.

Subsequently, DTS of a next picture is read (S303) to perform DTS readjustment (S304). Namely, the DTS of the picture to be decoded according to the trick mode is readjusted into a new DTS value by adopting one of Equations 2 and 5 to determine a decoding time point by an accurate frame rate. The DTS readjustment varies in accordance with the speed or direction of the trick play.

If $|DTS_n-STC|$<reference time (S305), picture decoding is executed (S306) and the process waits for a next decoding time point (S307). If $|DTS_n-STC|\geq$reference time (S305), the process waits for the next decoding time point (S307). Then, it is determined whether the playback is completed (S308). If the playback is not completed, the process goes back to the step S303. If the playback is completed, the process is ended.

Namely, if a difference between DTS and STC lies within the reference time in the step S305 of FIG. 12, the decoding is carried out on the corresponding picture to display. In doing so, the reference time can be set up by considering a decoding delay, a delay for video/audio synchronization, and the like according to a decoder device. The next decoding time in the step S307 is a decoding or display cycle according to the frame rate.

Even if there is no difference of the operational flow when the trick play mode is the fast reverse playback, the process should be modified in several steps. The modified steps in FIG. 12 for the reverse playback are explained as follows. First of all, STC initialization is carried out using the next PCR index of the I picture in the step S302. Secondly, Equation 5 is used as a method of calculating the new DTS value in place of Equation 2. Moreover, in case of reverse playback, there are differences in that the I picture is transmitted in the reverse direction and that the STC count is controlled to be decremented.

Thus, the present invention has such a trick mode as normal playback, fast forward playback, slow forward playback, fast reverse playback, and the like. In this case, the transport stream is stored in the storage medium without additional data, and the index information extracted in the storing process includes picture type, location of PCR packet of the corresponding picture, record location of the corresponding picture, etc. Moreover, the transmission bit rate is differently applied according to the trick play mode and the status of the VBV buffer of the decoder. Besides, the picture decoding time point is determined and displayed by the STC count initialization by the PCR packet in the trick mode and the DTS readjustment, whereby the trick play can be implemented without an additional device or processing.

Accordingly, in the digital video record/playback system and trick play method according to the present invention, the transport stream is stored without additional data, the index information extracted in the storing process includes picture type, location of PCR packet of the corresponding picture, record location of the corresponding picture, etc., and the decoding time point of the picture is determined to display the corresponding picture by appropriately adjusting the transmission bit rate and the status of the VBV buffer according to the trick play mode in playing back the digital video stream. Therefore, without additional appended devices and a series of processing, the present invention enables to implement the trick play of the user-selected direction and speed and to reduce costs.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. In a system recording and playing back a transport stream transmitted by a digital broadcast, a digital video record/playback apparatus comprising:
   an output control unit configured to output a predetermined playback mode;
   a transmission control unit configured to control a transmission bit rate and transmission time point of the transport stream based on the predetermined playback mode and buffer status information;
   a demux configured to perform a STC (system time clock) count initialization on a PCR (program clock reference) packet of the transport stream inputted via the transmission control unit, the demux configured to synchronize the STC count with a STC, the demux further configured to extract ES (elementary stream) data for a program data packet of the transport stream;
   a buffer configured to temporarily store the extracted ES data, the VBV buffer configured to play a role in buffering between the transmission bit rate and a decoding frame rate, the buffer configured to output a buffer status to the transmission control unit; and
   a decoder configured to adjust DTS (decoding timestamp) according to the predetermined playback mode of the output control unit, the decoder configured to control a decoding time point by comparing a difference between the adjusted DTS and the STC count value to a reference time and decoding the ES data outputted from the buffer, wherein the decoder is configured to calculate a difference between the DTS and a DTS value of a first picture at a beginning of a predetermined trick play and adjust the DTS according to the calculated difference and the predetermined playback mode.

2. The apparatus of claim 1, wherein the transmission control unit adopts an equation of $$\begin{cases} R_n = \dfrac{B - B_n}{t_{n+1} - t_n}, & \text{if } R_n \le R_{t\,max} \\ R_{t\,max}, & \text{if } R_n > R_{t\,max} \end{cases}$$

to control the transmission bit rate $R_n$ in case of a normal playback mode and wherein $t_{n+1}$-$t_n$ is a decoding cycle, B-$B_n$ is a vacant quantity of the buffer, and $R_{tmax}$ is a maximum transmission bit rate.

3. The apparatus of claim 1, wherein the transmission control unit is configured to control the decoding time point by adjusting the DTS by adopting an equation of $$\begin{cases} DTS'_n = DTS_0, & n = 0 \\ DTS_0 + \dfrac{DTS_n - DTS_0}{N}, & n \ne 0 \end{cases}$$

in case of an N-times speed forward trick play mode and wherein $DTS_n'$ is a new DTS value corresponding to the decoding time point and $DTS_0$ is a DTS value of the first picture.

4. The apparatus of claim 1, wherein the transmission control unit is configured to control the decoding time point by adjusting the DTS by adopting an equation of $$\begin{cases} DTS'_n = DTS_L, & n = 0 \\ DTS_L + \dfrac{DTS_L - DTS_n}{N}, & n \ne 0 \end{cases}$$

in case of an N-times speed reverse trick play mode and wherein $DTS_n'$ is a new DTS value corresponding to the decoding time point and $DTS_L$ is a DTS value of a first I picture at the beginning of a reverse trick play.

5. The apparatus of claim 1, wherein the transmission control unit is configured to output a PCR value of a next picture following a picture to be played back as a PCR value to be transmitted for the STC count initialization in case of an N-times speed reverse trick play mode.

6. The apparatus of claim 1, wherein if a playback mode and a first picture to be played back are determined, the demux is configured to initialize the STC count becoming a reference of the decoding time point with a PCR value of the determined picture and the STC count is then synchronized with the STC according to a playback direction to be sequentially incremented or decremented.

7. The apparatus of claim 1, wherein the decoder is configured to sequentially increment the STC count in case of a forward trick play or sequentially decrement the STC count in case of a reverse trick play.

8. A digital video record/playback apparatus, comprising:
a record control unit configured to only select transport packets corresponding to a program to be stored in a transport stream, the record control unit configured to extract picture information and PCR (program clock reference) of the program to be used in playback;
a storage medium configured to store the transport packets of the program selected in the record control unit, the picture information, and the PCR of the selected program;
an output control unit configured to output a predetermined playback mode;
a transmission control unit configured to control a transmission bit rate and transmission time point of the transport stream based on the predetermined playback mode and buffer status information;
a demux configured to perform a STC (system time clock) count initialization on a PCR (program clock reference) packet of the transport stream inputted via the transmission control unit, the demux configured to synchronize the STC count with a STC, the demux further configured to extract ES (elementary stream) data for a program data packet of the transport stream;
a buffer configured to temporarily store the extracted ES data, the buffer configured to play a role in buffering between the transmission bit rate and a decoding frame rate, the buffer configured to output a buffer status to the transmission control unit; and
a decoder configured to adjust DTS (decoding timestamp) according to the predetermined playback mode of the output control unit, the decoder configured to control a decoding time point by comparing a difference between the adjusted DTS and the STC count to a reference time and decoding the ES data outputted from the buffer,
wherein the decoder is configured to calculate a difference between the DTS and a DTS value of a first picture at a beginning of a predetermined trick play and adjust the DTS according to the calculated difference and the predetermined playback mode.

9. The apparatus of claim 8, wherein the record control unit is configured to store information of a location where a picture is stored, information of a location where a PCR value of the picture is stored, and each picture type in the storage medium, wherein the record control unit stores associative relation to the location information of the picture recorded in the storage medium by searching index information of the picture type, and wherein a time stamp is not stored in the storage medium.

10. The apparatus of claim 8, wherein the storage medium has a capacity sized to store digital video streams and is randomly accessible.

11. The apparatus of claim 8, wherein the transmission control unit adopts an equation of $$\begin{cases} R_n = \dfrac{B - B_n}{t_{n+1} - t_n}, & \text{if } R_n \le R_{t\,max} \\ R_{t\,max}, & \text{if } R_n > R_{t\,max} \end{cases}$$

to control the transmission bit rate $R_n$ in case of a normal playback mode and wherein $t_{n+1}$-$t_n$ is a decoding cycle, B-$B_n$ is a vacant quantity of the buffer, and $R_{tmax}$ is a maximum transmission bit rate.

12. The apparatus of claim 8, wherein the transmission control unit is configured to control the decoding time point by adjusting the DTS by adopting an equation of $$\left\{ \begin{array}{ll} DTS'_n = DTS_0, & n = 0 \\ DTS_0 + \dfrac{DTS_n - DTS_0}{N}, & n \neq 0 \end{array} \right\}$$

in case of an N-times speed forward trick play mode and wherein $DTS_n'$ is a new DTS value corresponding to the decoding time point and $DTS_0$ is a DTS value of the first picture.

13. The apparatus of claim 8, wherein the transmission control unit is configured to control the decoding time point by adjusting the DTS by adopting an equation of $$\left\{ \begin{array}{ll} DTS'_n = DTS_L, & n = 0 \\ DTS_L + \dfrac{DTS_L - DTS_n}{N}, & n \neq 0 \end{array} \right\}$$

in case of an N-times speed reverse trick play mode and wherein $DTS_n'$ is a new DTS value corresponding to the decoding time point and $DTS_L$ is a DTS value of a first I picture at the beginning of a reverse trick play.

14. The apparatus of claim 8, wherein the transmission control unit is configured to output a PCR value of a next picture following a picture to be played back as a PCR value to be transmitted for the STC count initialization in case of an N-times speed reverse trick play mode.

15. The apparatus of claim 8, wherein if a playback mode and a first picture to be played back are determined, the demux is configured to initialize the STC count becoming a reference of the decoding time point with a PCR value of the determined picture and the STC count is then synchronized with the STC according to a playback direction to be sequentially incremented or decremented.

16. The apparatus of claim 8, wherein the decoder is configured to sequentially increment the STC count in case of a forward trick play or sequentially decrement the STC count in case of a reverse trick play.

17. A playback method in a digital video record/playback apparatus, comprising:
   a step (a) of storing transport packets of a selected program, picture information, and a PCR (program clock reference) of the selected program;
   a step (b) of performing a STC (system time clock) count initialization using a value of the stored PCR and synchronizing the STC count with a STC according to a direction of a trick play mode;
   a step (c) of adjusting a DTS (decoding timestamp) of a picture to be decoded according to the direction and multiple-times speed of the trick play mode; and
   a step (d) of decoding to output picture data of the selected program by controlling a decoding time point by comparing a difference between the adjusted DTS and the STC count to a reference value and by referring to the picture information according to the trick play mode,
   wherein the step (d) includes calculating a difference between the DTS and a DTS value of a first picture at a beginning of a predetermined trick play and adjusting the DTS according to the calculated difference and the predetermined playback mode.

18. The playback method of claim 17, wherein in the step (b), the STC count is sequentially incremented in case of a forward trick play or sequentially decremented in case of a reverse trick play.

19. The playback method of claim 17, wherein in the step (c), the decoding time point is controlled by adjusting the DTS by adopting an equation of $$\left\{ DTS'_n = \begin{array}{ll} DTS_0, & n = 0 \\ DTS_0 + \dfrac{DTS_n - DTS_0}{N}, & n \neq 0 \end{array} \right\}$$

in case of an N-times speed forward trick play mode and wherein $DTS_n'$ is a new DTS value corresponding to the decoding time point and $DTS_0$ is a DTS value of the first picture.

20. The playback method of claim 17, wherein the decoding time point is controlled by adjusting the DTS by adopting an equation of $$\left\{ DTS'_n = \begin{array}{ll} DTS_L, & n = 0 \\ DTS_L + \dfrac{DTS_L - DTS_n}{N}, & n \neq 0 \end{array} \right\}$$

in case of an N-times speed reverse trick play mode and wherein $DTS_n'$ is a new DTS value corresponding to the decoding time point and $DTS_L$ is a DTS value of a first I picture at the beginning of a reverse trick play.

\* \* \* \* \*